United States Patent
Vaid et al.

(10) Patent No.: US 11,676,071 B2
(45) Date of Patent: Jun. 13, 2023

(54) IDENTIFYING AND RANKING ANOMALOUS MEASUREMENTS TO IDENTIFY FAULTY DATA SOURCES IN A MULTI-SOURCE ENVIRONMENT

(71) Applicant: Oracle International Corporation, Redwood Shores, CA (US)

(72) Inventors: Amit Vaid, Bengaluru (IN); Karthik Gvd, Bangalore (IN); Vijayalakshmi Krishnamurthy, Sunnyvale, CA (US); Vidya Mani, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 60 days.

(21) Appl. No.: 17/147,737

(22) Filed: Jan. 13, 2021

(65) Prior Publication Data
US 2021/0406110 A1    Dec. 30, 2021

(30) Foreign Application Priority Data

Jun. 30, 2020  (IN) .............................. 202041027680
Jul. 6, 2020   (IN) .............................. 202041028694

(51) Int. Cl.
*G06F 11/00*     (2006.01)
*G06N 20/00*     (2019.01)
(Continued)

(52) U.S. Cl.
CPC ......... *G06N 20/00* (2019.01); *G06F 11/0754* (2013.01); *G06F 11/0766* (2013.01);
(Continued)

(58) Field of Classification Search
CPC ............ G06F 11/0754; G06F 11/0766; G06K 9/6215; G06K 9/6247; G06K 9/6289;
(Continued)

(56) References Cited

U.S. PATENT DOCUMENTS

2003/0056147 A1* 3/2003 Yutkowitz .............. G05B 11/28
                                                          714/25
2006/0069955 A1* 3/2006 Oka ...................... G06F 21/316
                                                          714/25

(Continued)

FOREIGN PATENT DOCUMENTS

JP    2017-207904 A    11/2017

OTHER PUBLICATIONS

Chakraborty et al., "Fall-curve: A novel primitive for IoT Fault Detection and Isolation," Proceedings of the 16th ACM Conference on Embedded Networked Sensor Systems, 95-107, (2018).

(Continued)

*Primary Examiner* — Sarai E Butler
(74) *Attorney, Agent, or Firm* — Invoke

(57) ABSTRACT

Techniques for identifying anomalous multi-source data points and ranking the contributions of measurement sources of the multi-source data points are disclosed. A system obtains a data point including a plurality of measurements from a plurality of sources. The system determines that the data point is an anomalous data point based on a deviation of the data point from a plurality of additional data points. The system determines a contribution of two or more measurements, from the plurality of measurements, to the deviation of the data point from the plurality of additional data points. The system ranks the at least the two or more measurements, from the plurality of measurements, based on the respective contribution of each of the two or more measurements to the deviation of the anomalous data point from the plurality of prior data points.

22 Claims, 11 Drawing Sheets

(51) Int. Cl.
*G06F 11/07* (2006.01)
*G06F 18/22* (2023.01)
*G06F 18/25* (2023.01)
*G06F 18/2135* (2023.01)

(52) U.S. Cl.
CPC .......... *G06F 18/2135* (2023.01); *G06F 18/22* (2023.01); *G06F 18/251* (2023.01)

(58) Field of Classification Search
CPC .... G06K 9/00536; G06N 20/00; G06V 10/77; G06V 10/774; G06V 10/803; G06V 10/945; G06V 10/82
USPC ...................................................... 714/1–57
See application file for complete search history.

(56) References Cited

U.S. PATENT DOCUMENTS

| | | | |
|---|---|---|---|
| 2007/0101202 A1* | 5/2007 | Garbow | G06F 11/008 714/47.2 |
| 2008/0040088 A1* | 2/2008 | Vankov | H04L 41/0681 714/100 |
| 2010/0275262 A1* | 10/2010 | Anand | H04L 63/1416 714/48 |
| 2013/0042148 A1* | 2/2013 | Fujimaki | G06F 11/079 714/37 |
| 2013/0204808 A1* | 8/2013 | Jiang | G06N 20/00 706/46 |
| 2015/0051847 A1* | 2/2015 | Angello | F01D 21/003 702/35 |
| 2015/0339600 A1* | 11/2015 | Dodson | G06Q 10/04 703/2 |
| 2017/0139803 A1* | 5/2017 | Maheshwari | G06F 11/3461 |
| 2018/0107574 A1 | 4/2018 | Hara et al. | |
| 2019/0121838 A1* | 4/2019 | Yi | G06K 9/6297 |
| 2019/0303710 A1* | 10/2019 | Saha | G06F 16/9038 |
| 2019/0323869 A1 | 10/2019 | Kodeswaran et al. | |
| 2020/0134510 A1* | 4/2020 | Basel | G06N 3/084 |
| 2020/0137610 A1 | 4/2020 | Faivishevsky et al. | |
| 2020/0257614 A1* | 8/2020 | Davis | G06F 11/3636 |
| 2021/0092137 A1* | 3/2021 | Sarpatwar | G06N 20/00 |
| 2021/0174196 A1* | 6/2021 | Desmond | G06K 9/6263 |
| 2021/0374864 A1* | 12/2021 | Kchouk | G06F 16/2379 |

OTHER PUBLICATIONS

Choi et al., "Detecting and Identifying Faulty IoT Devices in Smart Home with Context Extraction," 48th Annual IEEE/IFIP International Conference on Dependable Systems and Networks, 610-621 (2018).

Gaddam et al., "Detecting Sensor Faults, Anomalies and Outliers in the Internet of Things: A Survey on the Challenges and Solutions," Electronics, 9:511 (2020).

Haque et al., "Sensor Anomaly Detection in Wireless Sensor Networks for Healthcare," Sensors (Basel), 15(4):8764-8786 (Apr. 2015).

Liu et al., "A Self-Learning Sensor Fault Detection Framework for Industry Monitoring IoT," Hindawi Publishing Corporation Mathematical Problems in Engineering, vol. 2013, Article ID 712028, 8 pages.

Raghu et al., "Machine Learning Based Hybrid Model for Fault Detection in Wireless Sensors Data," EAI Endorsed Transactions on Scalable Information Systems, (2019), 8 pages.

Wise et al., "Upset and sensor failure detection in multivariate processes," Prepared for presentation at the 1989 AIChE Annual Meeting Nov. 5-10, 1989, Symposium on Statistics and Quality Control, 41 pages.

Xiao et al., "Nonlinear Polynomial Graph Filter for Anomalous IoT Sensor Detection and Localization," IEEE Internet of Things Journal, 7(6):4839-4848 (Jun. 2020).

\* cited by examiner

| 441 → | 6.03 | 8.66 | 12.35 | 18.56 ← 440 |
|---|---|---|---|---|
| | 12.09 | 16.17 | 18.42 | 26.43 |
| | 32.58 | 231.42 | 227.08 | 324.16 |

441a ↗ (under 231.42)    441b ↗ (under 324.16)

Figure 4D

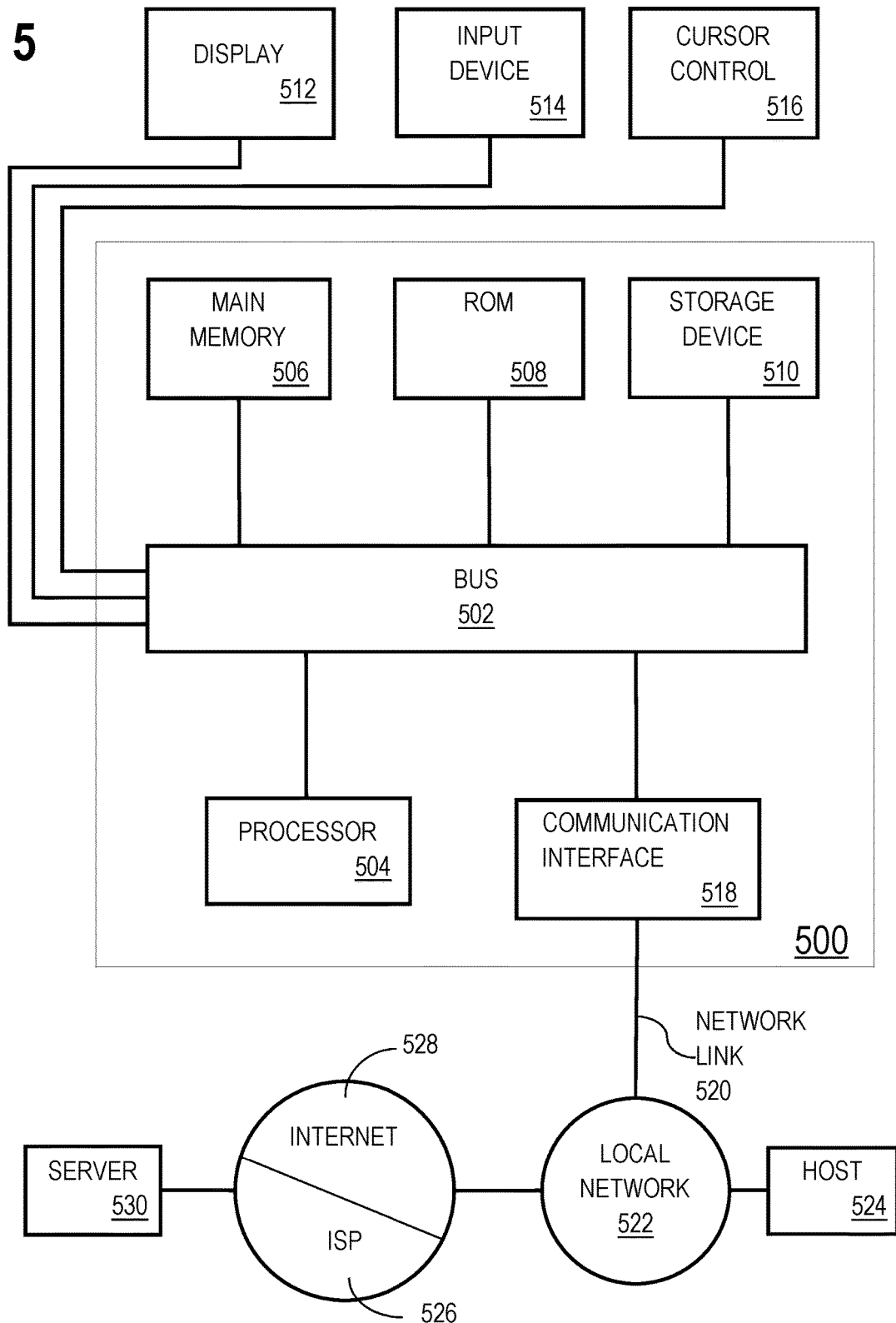

IDENTIFYING AND RANKING ANOMALOUS MEASUREMENTS TO IDENTIFY FAULTY DATA SOURCES IN A MULTI-SOURCE ENVIRONMENT

INCORPORATION BY REFERENCE; DISCLAIMER

This application is hereby incorporated by reference: India Application No. 202041027680 filed on Jun. 30, 2020 and India Application No. 202041028695 filed on Jul. 6, 2020. The Applicant hereby rescinds any disclaimer of claim scope in the parent applications or the prosecution history thereof and advises the USPTO that the claims in this application may be broader than any claim in the parent applications.

TECHNICAL FIELD

The present disclosure relates to the analysis of an anomalous data point that is based on multiple measurements corresponding to a period of time. In particular, the present disclosure relates to determining and ranking the contributions of the measurements to the deviation of the anomalous data point from other data points.

BACKGROUND

The Internet of Things (IOT) provides many different sources of data, including different sensors from different devices, that may be used to analyze a system. Many IoT applications obtain data from data-generating processes which may either reflect activity in the system or observations collected about entities. When the data-generating process behaves unusually, an anomalous data point is generated, and the anomalous data point contains useful information about abnormal characteristics of the systems and entities that impact the data generation process. The recognition of such unusual characteristics provides useful application-specific insights.

Sensors are often used to track various environmental and location parameters in many real-world applications. Sudden changes in the underlying patterns may represent events of interest. Event detection is one of the primary motivating applications in the field of sensor networks. However, even when an anomaly is detected in a data-generating process, the anomalous data point may not provide any information about which data sources, among the many different data sources generating data about the data-generating process, is responsible for the anomalous nature of the anomalous data point.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-4F illustrate an example embodiment of identifying an anomalous data point and ranking measurement sources according to their contribution to the anomalous categorization of the data point, in accordance with one embodiment; and FIG. 5 shows a block diagram that illustrates a computer system in accordance with one or more embodiments.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

1. GENERAL OVERVIEW
2. ARCHITECTURAL OVERVIEW
3. RANKING DATA SOURCES ACCORDING TO EFFECT ON OUTLIER VALUES
4. MACHINE LEARNING ENGINE TRAINING TO IDENTIFY ANOMALOUS MULTI-SOURCE DATA POINTS
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

Embodiments identify anomalous multi-source data points from among a set of data points describing a monitored system. Embodiments rank the data sources of each multi-source data point classified as being "anomalous" based on the extent to which the data source affects the classification of the data point as being "anomalous." The system presents the ranking of the measurement values (and/or data sources corresponding to the measurement values) for further review. Advantageously, the system identifies anomalous behavior of a data point based on a composite score corresponding to multiple factors while identifying individual factors for analysis based on the contribution of each factor to the deviation of the data point from other data points. One or more embodiments described in this Specification and/or recited in the claims may not be included in this General Overview section.

2. Architectural Overview

Figure 1:
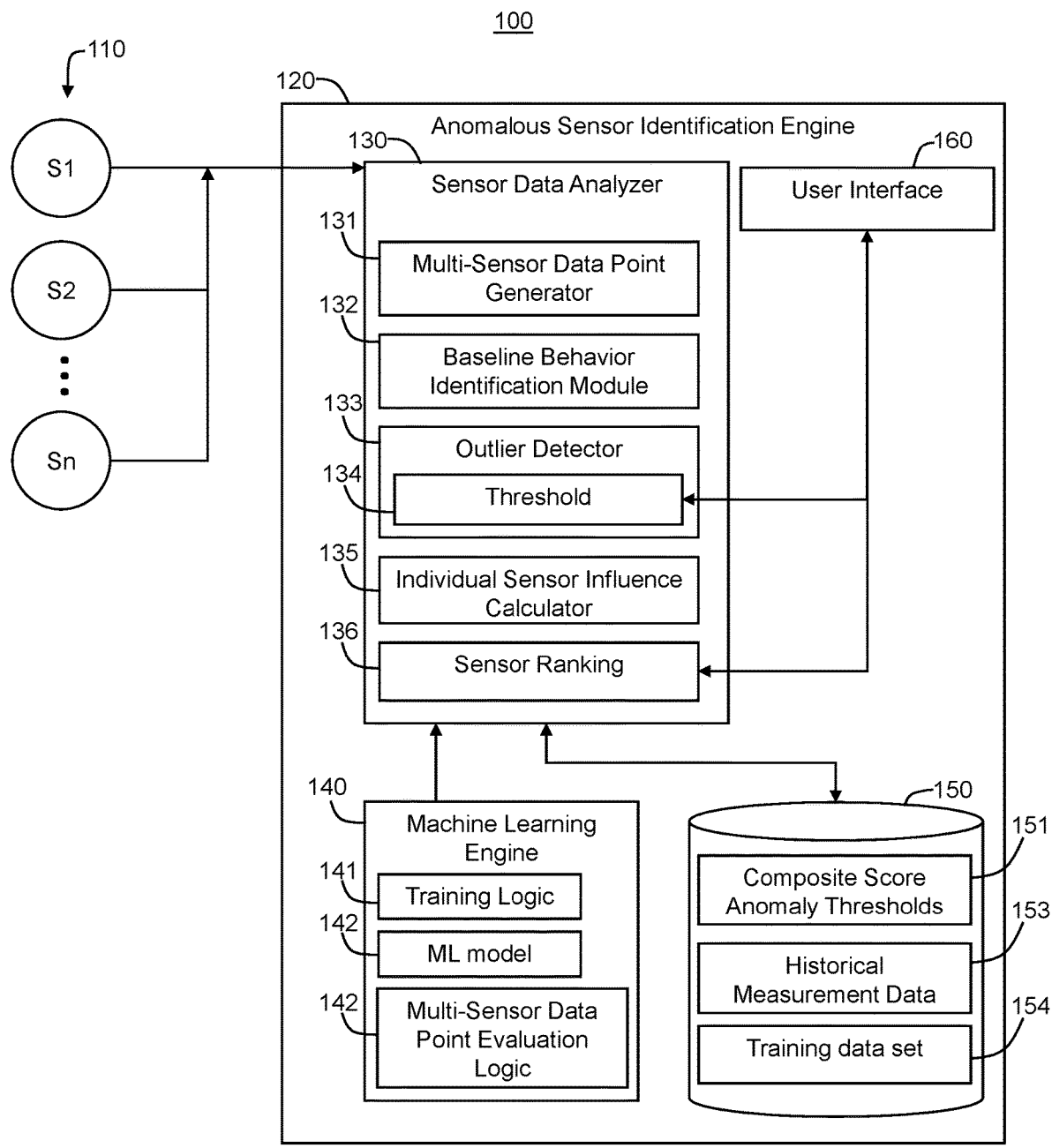
FIG. 1 illustrates a system in accordance with one or more embodiments.

FIG. 1 illustrates a system 100 in accordance with one or more embodiments. As illustrated in FIG. 1, system 100 includes multiple sensors (S1-Sn) 110 that generate measurements describing a device or system being monitored. An anomalous sensor identification engine 120 obtains and analyzes measurements output by the sensors to identify one or more sensors as being anomalous. A sensor data analyzer 130 obtains the measurement data from the sensors 110. A multi-sensor data point generator 131 groups measurements from multiple sensors 110 at a same point in time, or within a same period of time, to generate a single data point. A baseline behavior identification module 132 analyzes values of a set of data points to identify baseline behaviors of the set of data points. In one embodiment, identifying baseline behaviors includes performing a principal component analysis (PCA) on the set of data points to identify principal components of the set of data points. The principal components may be used to define the baseline behaviors of the data points.

An outlier detector 132 analyzes the set of data points to identify one or more outlier data points. In one embodiment, the outlier detector 132 compares values of each data point to values of principal components of the set of data points to generate a composite score for each data point. The outlier detector 134 analyzes the composite scores of the set of data points to identify outlier data points. In one embodiment, the outlier detector 133 compares the composite score with a threshold value 134 to identify outlier composite scores. In one embodiment, the threshold score 134 is a fixed percentage value, such that a fixed percentage of composite scores are identified as anomalous. In one embodiment, the user interface 160 presents anomalous data points to a user and receives a user input to accept or reject the classification of the data points as "anomalous." When the user rejects the classification of one or more composite scores as "anomalous," the outlier detector 133 may modify the threshold 134 by adjusting percentage of composite scores that is to be classified as anomalous. In one embodiment, the composite score anomaly threshold 151 is stored in a data repository 150, and the outlier detector 133 updates the composite score anomaly threshold 151 in the data repository 150.

In addition, or in the alternative, the threshold score 134 may be a percentage variance from a baseline behavior of the set of data points. For example, the outlier detector 133 may determine that a composite score varies from identified baseline behaviors of other data points by 20% and the threshold 134 may be set at 10%. The outlier detector 133 may identify the data point corresponding to the outlier composite score as "anomalous."

In addition, or in the alternative, a machine learning engine 140 may classify data points as being anomalous or non-anomalous based on a machine learning model 142. Training logic 141 uses a training data set 154 to train a machine learning (ML) model 142 to classify data points as anomalous or not. The machine learning engine 140 includes multi-sensor data point evaluation logic 142 to receive new data points from the multi-sensor data point generator 131 and to classify the data points as anomalous or not by applying the machine learning model 142 to the new data points.

In one or more embodiments, the machine learning engine 140 outputs the classification of data points as anomalous or not to the user interface 160. A user may provide feedback whether the classification is correct. The machine learning engine 140 updates the outlier score anomaly thresholds 151 based on the user feedback. The machine learning engine also includes the user feedback in the historical measurement data 153 and generates a new training data set 154. The machine learning engine 140 re-trains the machine learning model 142 based on the updated training data set 154.

The sensor data analyzer 130 includes an individual sensor influence calculator 135 to calculate, for each data point identified as anomalous, a level of influence of each source in the data point on the "anomalous" categorization. For example, for an outlier score generated based on ten measurements from ten different sensors 110, one of the sensors may malfunction and contribute more to the "anomalous" categorization than other sensors. The individual sensor influence calculator 135 generates a score, for each source of measurement data in a data point, representing the effect of that source on the "anomalous" categorization of the data point.

The sensor data analyzer 130 generates a sensor ranking 136 based on the influence scores output by the individual sensor influence calculator 135. The sensor ranking 136 ranks the sensors corresponding to the measurements that make up the anomalous data point based on the contribution of the sensors to the "anomalous" categorization of the data point. In one or more embodiments, the sensor ranking is provided to a user via the user input 160 to allow the user to see which sensors 110 in the system 100 have contributed most to categorization of the data points as "anomalous."

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 150 is any type of storage unit and/or device (e.g., a file system, database, collection of tables, or any other storage mechanism) for storing data. Further, a data repository 150 may include multiple different storage units and/or devices. The multiple different storage units and/or devices may or may not be of the same type or located at the same physical site. Further, a data repository 150 may be implemented or may execute on the same computing system as the anomalous sensor identification engine 120. Alternatively or additionally, a data repository 150 may be implemented or executed on a computing system separate from the anomalous sensor identification engine 120. A data repository 150 may be communicatively coupled to the anomalous sensor identification engine 120 via a direct connection or via a network.

Information describing outlier score anomaly thresholds 151, historical measurement data 153, and training data sets 154 may be implemented across any of components within the system 100. However, this information is illustrated within the data repository 150 for purposes of clarity and explanation.

In one or more embodiments, anomalous sensor identification engine 120 refers to hardware and/or software configured to perform operations described herein for receiving and analyzing sensor measurements, combining the sensor measurements into data points, identifying anomalous data points, and identifying and ranking an effect of individual sensors on the "anomalous" classification of the data points. Examples of operations for identifying the effect of individual sensors on the "anomalous" classification of data points are described below with reference to FIG. 2.

In an embodiment, the anomalous sensor identification engine 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 160 refers to hardware and/or software configured to facilitate communications between a user and the anomalous sensor identification engine 120. Interface 160 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 160 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 160 is specified in one or more other languages, such as Java, C, or C++.

3. Ranking Data Sources According to Effect on Outlier Values

Figure 2A:
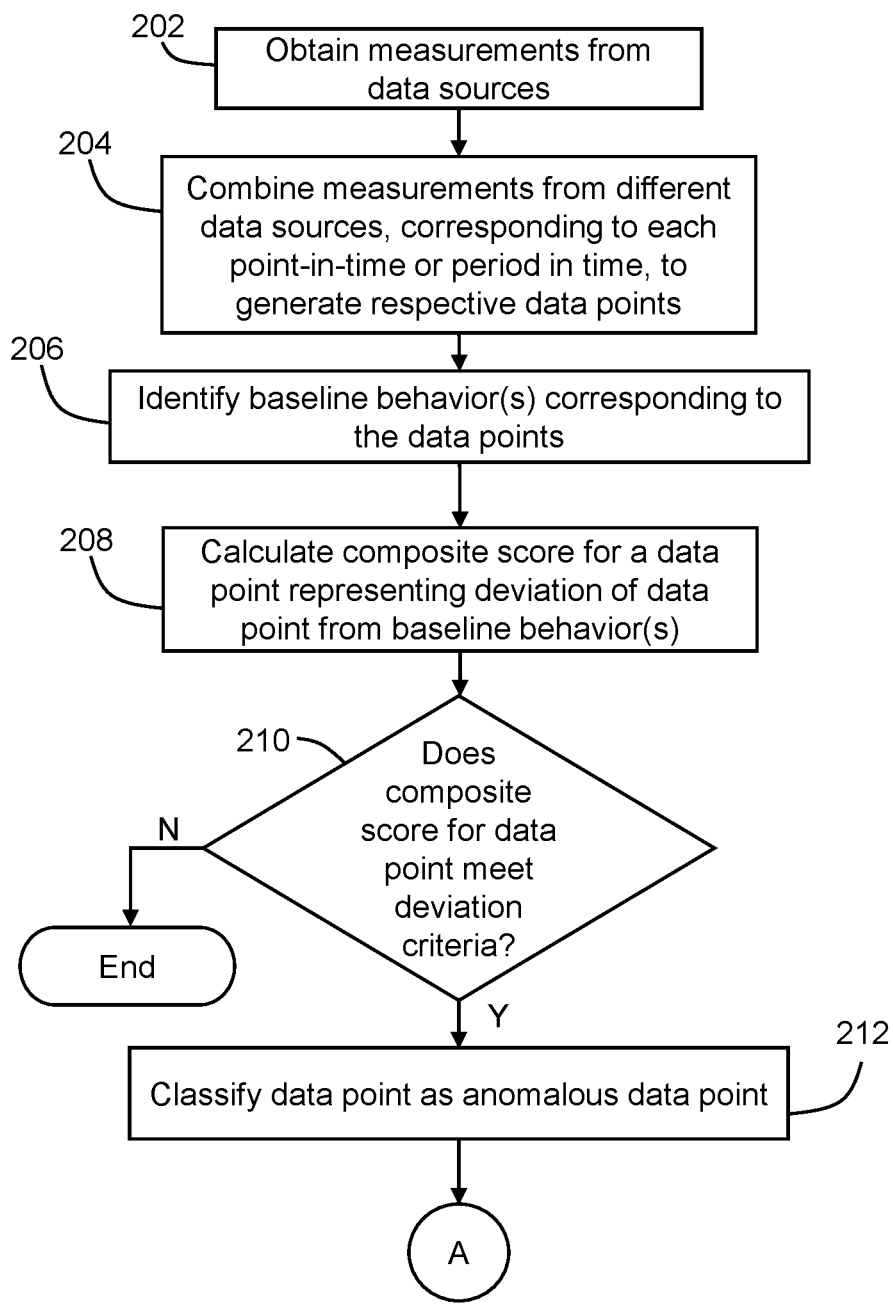
FIG. 2A illustrates an example set of operations for determining baseline behavior based on a set of data points in accordance with one or more embodiments.
Figure 2B:
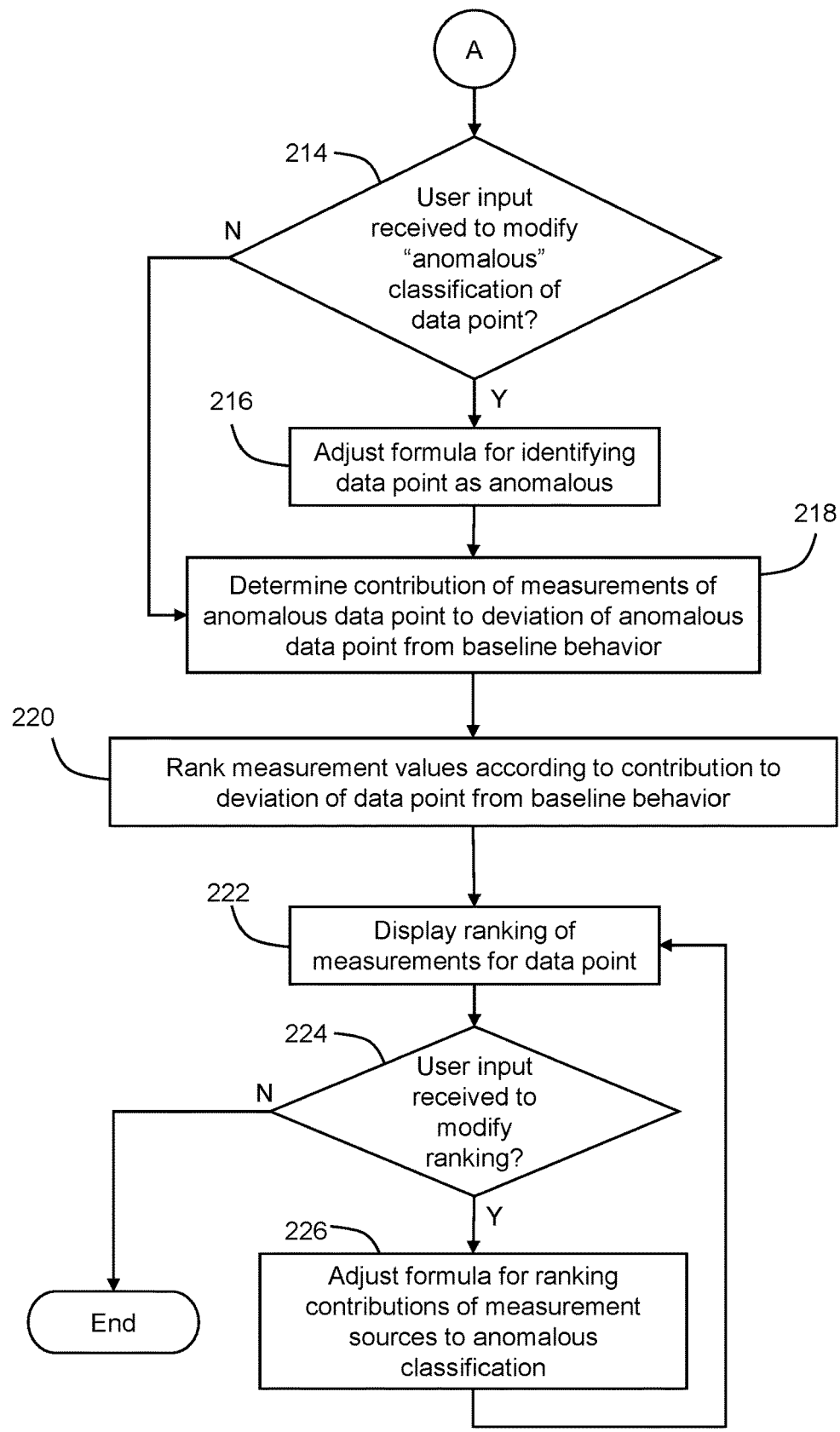
FIG. 2B illustrates an example set of operations for determining a ranking of measurements of a data point based on the respective contributions of the measurements to the deviation of the data point from baseline behavior.

FIGS. 2A and 2B illustrate an example set of operations for identifying and ranking measurements of a composite data point in accordance with one or more embodiments. One or more operations illustrated in FIGS. 2A and 2B may be modified, rearranged, or omitted altogether. Accordingly, the particular sequence of operations illustrated in FIGS. 2A and 2B should not be construed as limiting the scope of one or more embodiments.

A system that detects anomalous data points and ranks the contributions of individual data sources may be in communication with one or more data repositories that collect and store data from various sources, including sensors, networks, databases, user terminals, etc. The system obtains a set of measurements generated by a data-generating process in a system (Operation 202). For example, the system may obtain measurements from sensors connected to various devices in communication with the Internet, network metrics, such as data storage, power consumption, etc.; and industry data, such as prices, products, etc.

The system combines a set of measurements from different sources, corresponding to a particular point-in-time, or defined period of time, into a single data point (Operation 204). The system generates a set of data points based on measurements from multiple sources at multiple points in time. For example, the system may take a measurement from ten different sensors, each monitoring a different metric of the same data-generating process, at a given point of time and store the measurements together as one data point. If represented on a visual graph, the data point may be mapped on a multi-axial graph in which each measurement contributes to a position of the data point on the graph. Different data points, each comprising multiple measurements from different data sources at a same point in time, make up a set of data points.

The system identifies a baseline behavior(s) of a set of data points (Operation 206). The baseline behavior may be represented as a line or plane in n-dimensions that is computed based on the values of the data points. The plane (or line) is a "fitting" plane that is generated to minimize a sum of distances between the plane and each of the data points.

In one or more embodiments, the system performs a principal component analysis (PCA) on the set of data points. Based on the PCA, the system determines one or more principal components that respectively represent baseline behaviors. In one embodiment, in which the system implements PCA as an anomaly detection algorithm, the principal component is an eigenvector representing a direction of maximum variation of each respective measurement making up the data point.

The system calculates a composite score for each data point by calculating a distance of the data point from each baseline behavior representation that is computed as a function of the data points. (Operation 208). Accordingly, the composite score represents a deviation of the data point from the baseline behavior. The composite score for a data point increases in proportion to the deviation of the data point from the baseline behavior.

In one or more embodiments, the anomaly detection system may assign a relative weight to a value representing a distance from the data point to one or more of the principal components. The value representing the distance from the data point to one or more of the principal components may be a weighted value representing one or more of a relative influence, a relative importance, a relative accuracy, or a relative completeness of one measurement relative to another. The anomaly detection system may alternatively, or in addition, assign a relative weight to a principal component or a measurement for any other reason.

The anomaly detection system compares the composite scores of data points to the predetermined deviation criteria to determine whether the corresponding data point is anomalous (Operation 210). The anomaly detection system may employ any anomaly-detection algorithm to provide the deviation criteria and to determine that a data point is anomalous. Examples of anomaly-detection algorithms include local outlier factor (LOF) algorithms, a principal component analysis (PCA) algorithm, a neural network auto encoder algorithm, or any other anomaly-detection algorithm.

In one embodiment, the deviation criteria include a percentage of all of the data points. In other words, the system may apply a fixed "contamination percentage" to the set of data points to designate a certain number of the data points as "anomalous." For example, the system may have a fixed contamination percentage value of 2%. Accordingly, the system designates the data points with composite scores in the outermost 2% of all the composite scores as "anomalous."

In addition, or in the alternative, the system may designate data points having composite scores that vary from the baseline behaviors by a predetermined amount as being "anomalous." For example, the system may identify any data points having composite scores that vary from a baseline behavior by more than 20% as being anomalous.

In addition, or in the alternative, the system may apply a machine learning model to composite values of data points to identify one or more data points as being anomalous. The machine learning model is trained using data sets created from historical measurement data. The machine learning model is applied to data points of the data set to identify anomalous data points.

If the composite score for a data point meets the deviation criteria, the system classifies the data point as "anomalous" (Operation 212). For example, in one or more embodiments, data points may be mapped to composite scores and anomalous/non-anomalous classifications in a table stored in a data repository.

The system determines if a user input is received to modify the classification of a data point as "anomalous" (Operation 214). For example, once a data set is analyzed, and one or more data points are identified as being anomalous, the system may display the results to a user via a user interface. The user may provide feedback to change the designation of one or more data points as being anomalous or not anomalous.

In one or more embodiments, the system displays normalized composite scores to a user to allow the user to compare the relative values of the data points. For example, the system may assign a value equal to a baseline behavior as "0" and an upper-most value, among all the composite scores, as "1." The system may calculate the normalized composite scores of each data point, as falling between "0" and "1" and may display the normalized scores to the user.

In one or more embodiments, the system also displays for a user a predetermined number, or percentage, of composite scores that are not classified as anomalous. For example, the system may display the composite scores for data points having values within 10% of an anomalous composite score. This may allow the user to determine whether data points that had not been classified as "anomalous" should be re-classified or not.

Based on the user feedback, the system adjusts the formula for identifying a data point as being "anomalous" (Operation 216). For example, in the embodiment in which a fixed percentage of data points is classified as being anomalous, the system may alter the fixed percentage based on the user feedback. In addition, or in the alternative, in the embodiment in which data points are classified as being anomalous based on their degree of variation from baseline behaviors of other data points in a set of data points, the system may alter the percentage that defines the variation of a composite score from baseline behavior values at which a data point is classified as anomalous. In addition, or in the alternative, in the embodiment in which a machine learning model is applied to the data set to identify one or more data points as anomalous, the user feedback may be used to update a training data set to re-train the machine learning model to identify anomalous data points.

If a data point is classified as an anomalous data point, the anomaly detection system determines a contribution of each measurement of the anomalous data point to the deviation of the anomalous data point from the baseline behavior(s) (Operation 218). The system identifies a baseline behavior data point that is closest to the anomalous data point. The baseline behavior data point that is closest may be identified from baseline behavior data points across multiple baseline behaviors. A baseline behavior data point may be a hypothetical data point on a representation of a baseline behavior (e.g., a hypothetical data point on a principal component). The baseline behavior data point may be the same data point that was previously used to compute the composite score that represented a deviation of the anomalous data point from the baseline behavior.

The system computes a difference value between (a) a measurement of the anomalous data point and (b) a corresponding measurement of the closest baseline behavior data point. The contribution of the measurement of the anomalous data point, to the deviation of the anomalous data point, is the difference value or a value computed based on the difference value.

In one embodiment, the calculation of the composite score for the data point includes measuring a distance from the data point to each respective principal component. In such an embodiment, the system may calculate the contribution of the measurement to the determination that the data point is anomalous by calculating a difference between the measurement value and a point along a corresponding principal component that is closest to the measurement value.

In another embodiment, the anomaly detection system determines the contribution of the selected measurement to the determination that the data point is anomalous by applying the measurement values to a neural network and identifying, based on the outputs from the neural network, the variation of the measurement value from a trend defined by other measurement values, or from an expected measurement value.

Once the contribution of each measurement has been determined, the system ranks each measurement according to its contribution to the determination that the data point is anomalous (Operation 220). For example, in an embodiment in which a first measurement is a first distance from a first closest point on a first principal component, and a second measurement is a second distance from a second closest point on a second principal component, the system may determine that the greater distance corresponds to a greater contribution to the determination that the data point is anomalous. Accordingly, the system may assign a greater rank to the measurement having the distance, among the first and second distances.

The system then displays the ranking of each measurement of the anomalous data point (Operation 222). For example, the system may display a sensor name associated with the measurement, a measurement value, a variation of the measurement value from the closest point on the corresponding principal component, a number representing a rank number relative to other measurements, or any other information. In one embodiment, the system displays the ranking as a graph. In one embodiment, the ranking is displayed as an interface allowing the user to select a corresponding measurement to obtain additional information about the measurement, the source sensor or data source, the level of variation of the measurement from an expected level, or any other information.

In one or more embodiments, the system normalizes measurement values, so that a displayed value falls within a predetermined range of values, such as between 0 and 1. For example, a system may include different sensors that provide measurement values with different measurement units in different ranges. In one or more embodiments, the system bounds an upper-most limit of the sensor range as "1", bounds the lower-most limit of the sensor range as "0", omits the sensor's unit of measure, and outputs the normalized sensor value to a user, allowing the user to compare the relative measurement values of different sensors measuring different characteristics of the system.

The system determines whether a user input is received to modify the ranking of measurement sources contributing to the "anomalous" classification of a data point (Operation 224). For example, the system may display sensor information for three different data points, identifying the top-ranked sensors that have contributed to the data points being classified as "anomalous." A user may interact with the user interface to adjust the ranking of the sensors to increase or reduce a sensor's ranking. In one or more embodiments, the system may display, along with a sensor, a range of values considered "normal operating values" for the sensor. If the sensor generates values outside the indicated range, the ranking of the sensor may increase. The user may adjust the range to increase or decrease the normal operating values for the sensor.

Based on the user feedback, the system adjusts the formula for ranking the contributions of the measurement sources to the classification of a data point as being "anomalous" (Operation 226). For example, if a measurement source is a sensor, and the user provided feedback that a certain range of values should be considered normal for the sensor, the system may adjust the formula for ranking the measurement sources to reduce the ranking of the user-indicated sensor. Alternatively, if the user provides feedback that a certain sensor should have a higher ranking, the formula may be adjusted accordingly.

In one embodiment, an anomaly detection system identifies the sensors or data sources having the greatest contribution to the deviation of an anomalous data point from baseline behaviors. The anomaly detection system may notify a user or operator that the identified sensors or data sources are in a state of fault, providing the user or operator with actionable insights into the system.

Figure 3:
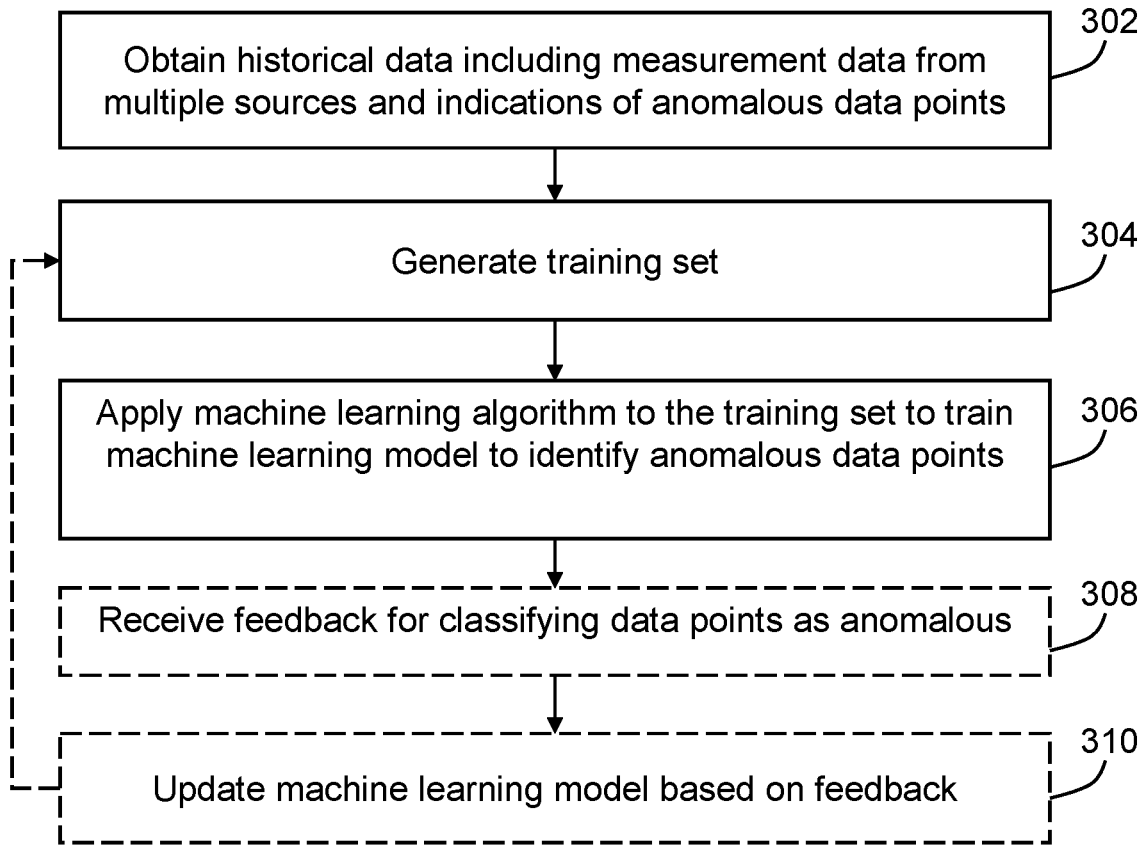
FIG. 3 illustrates an example a set of operations for training a machine learning model to identify anomalous data points in accordance with one or more embodiments.

4. Machine Learning Engine Training to Identify Anomalous Multi-Source Data Points FIG. 3 illustrates an example of operations for training a machine learning model to identify anomalous multi-source data points.

A machine learning engine obtains historical data including measurement data from multiple data sources, such as sensors (Operation 302). The data sources monitor a system. Measurements from multiple data sources at one point in time, or over one period of time, make up a data point. In one embodiment, the measurements of the multiple data sources are represented as a single composite score. For example, in one embodiment, a principal component analysis (PCA) is performed on the measurement values for each data point to identify the variation of the measurements from principal components. The resulting values are combined to generate, for each data point, a composite value. In one embodiment, the historical data includes a set of data points representing measurements obtained in a system over a period of time. The historical data further includes, for each data point, a composite score and an indication whether the data point is anomalous or not.

The machine learning engine generates a training data set based on the historical data (Operation 304). The training data set includes a subset of the historical data representing data points comprising measurements obtained at different times and indications whether the data points are anomalous or not.

The machine learning engine applies a machine learning algorithm to the training set to train a machine learning model to identify anomalous data points in the training data set (Operation 306). In one embodiment, applying the machine learning algorithm to the training set results in output values, for each respective data point, indicating whether the data point is anomalous. The output values are compared with target values, and parameters of the model are adjusted based on the comparison.

In one embodiment, the ML model receives feedback based on the output values of the target values. (Operation 308). The user may correct, approve, or adjust the values to provide target values for the machine learning model. For example, the machine learning model may classify a data point as being anomalous, and a user may provide feedback that the data point is not anomalous. Alternatively, the machine learning model may classify a data point as non-anomalous, and a user may provide feedback that the data point is anomalous.

In addition, or in the alternative, the output values may be compared to known target values, and the machine learning engine may automatically adjust the parameters of the model without user input. Based on comparing the output values with the target values, the machine learning engine updates the machine learning model (Operation 310).

The machine learning engine applies the updated machine learning model to the training datasets and repeats the process of comparing output values to target values, receiving feedback, and updating the machine learning model. In one or more embodiments, the machine learning model is subsequently compared to a validation dataset to validate and refine the machine learning model. In one or more embodiments, the machine learning model may be compared with a final test dataset prior to applying the machine learning model to incoming multi-source data points.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

In one or more embodiments, a system is monitored by multiple measurement-generating devices. For example, in a computer system, one temperature sensor may monitor a temperature of a computer component, another two temperature sensors may monitor a temperature of the air around the computer system, a moisture sensor may monitor humidity in the air around the system, a power sensor may monitor power supplied to the system, an application may monitor power consumed by components in the system, and an application may monitor data traffic to and from the system. All the sensors and applications may generate measurement data describing the system. In one or more embodiments, an anomaly detection system identifies anomalous multi-source data points and ranks measurement-generating sources according to their contribution to the "anomalous" classification of the data points.

Figure 4A:
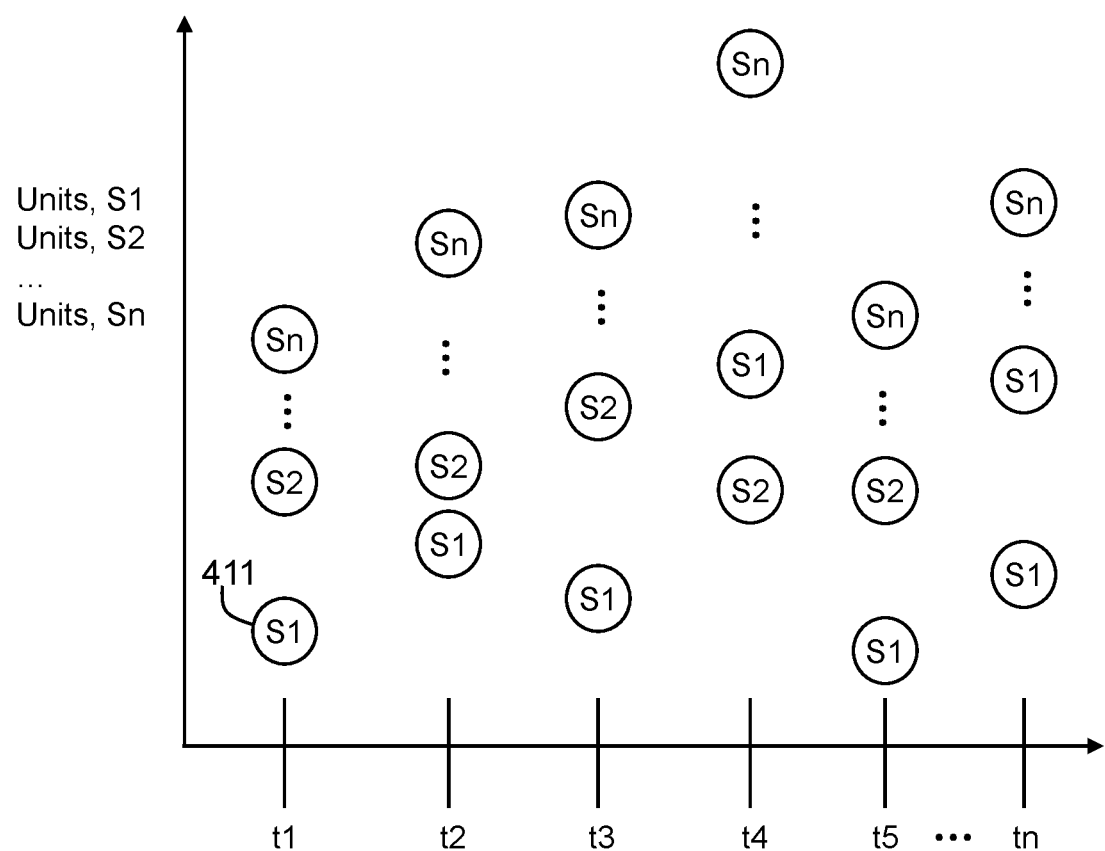

A system receives measurement data from multiple sensors S1-Sn. FIG. 4A illustrates measurement data from the multiple sensors S1-Sn divided into multiple different periods of time t1-tn. The vertical axis corresponds to different units of measurement for different sensors S1-Sn. Each measurement point may represent a single measurement at a single point in time, or a combination of measurements over a period of time. For example, t1 may represent a one-minute period of time, and measurement 411 may be an average of data values output by the sensor S1 during the one-minute time period t1. Alternatively, measurement 411 may be a single data value output by the sensor S1 during the time period t1. Alternatively, measurement 411 may be a single data value output by the sensor S1 at a point in time t1.

Figure 4B:
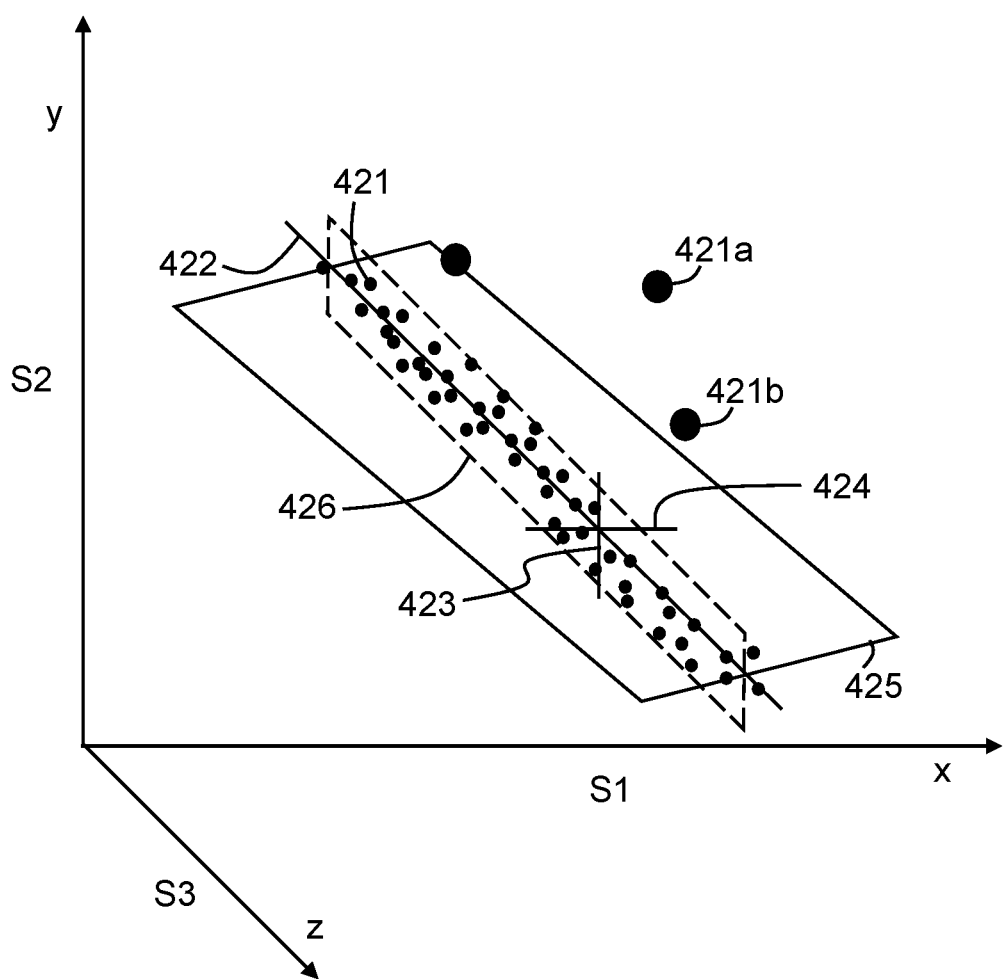

In one embodiment, an anomaly detection system generates a set of data points 421 by combining the measurement values from the different sensors S1-Sn at each respective time period t1-tn. FIG. 4B illustrates a three-dimensional depiction of raw composite scores made up of measurements from three different measurement sources. Axis x represents measurements from sensor S1; axis y represents measurements from sensor S2; axis z represents measurements from sensor S3. While FIG. 4B illustrates a three-dimensional graph for purposes of clarity, embodiments are not limited to three dimensions or to visual depictions of measurement data. Instead, embodiments encompass any number of dimensions and any number of measurement sources being used to generate composite values. In addition, while FIG. 4B represents measurement values from three measurement sources, in another embodiment, multiple measurement sources may be combined to map more than three measurement sources onto a three-dimensional graph. For example, measurement values of sensors S1 and S2 may be combined to generate a combined value, and axis x may correspond to the combined value of sensors S1 and S2.

An anomaly detection system performs a principal component analysis (PCA) of the set of data points 421 (including data points 421a and 421b) to identify baseline behaviors of the set of data points 421. The anomaly detection system computes the principal components 422, 423, and 424 of the set of data points 421. Plane 425 represents a hyperplane defined by principal components 422 and 423. Plane 426 represents a hyperplane defined by principal components 422 and 423. A third hyperplane defined by principal components 423 and 424 is omitted from FIG. 4B for purposes of clarity in depiction.

Figure 4C:
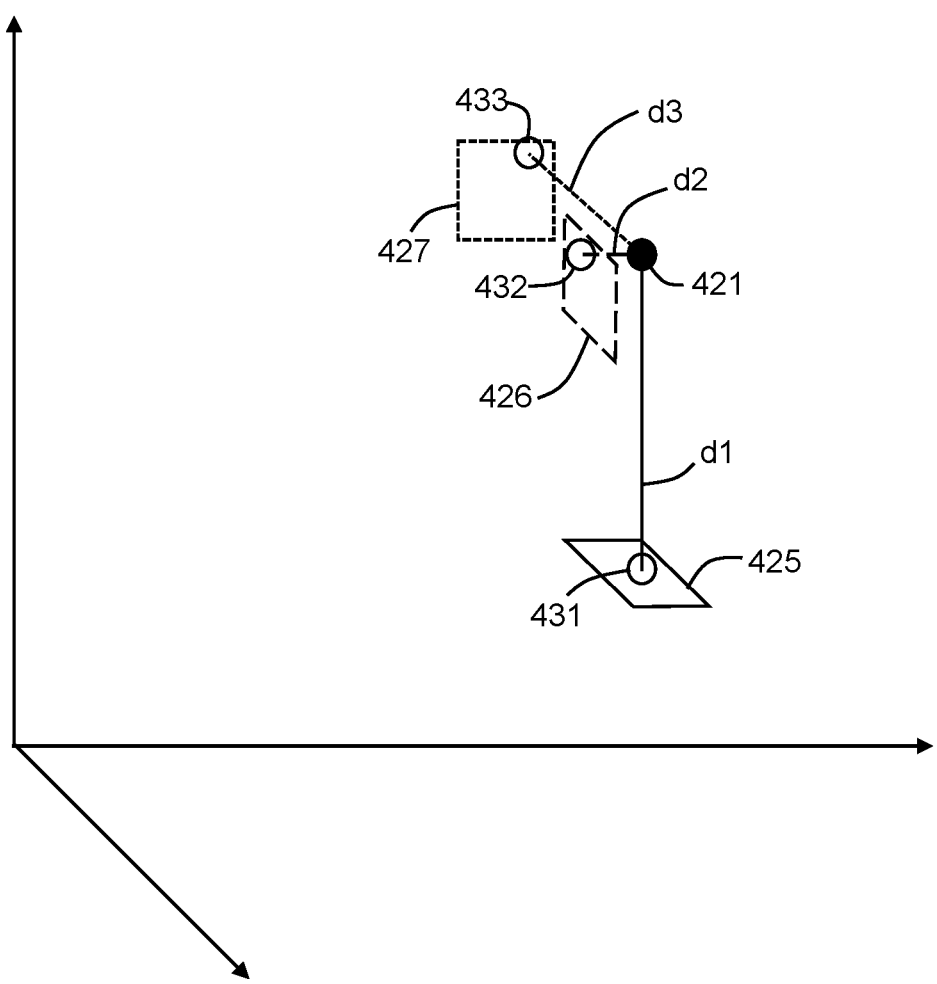

The anomaly detection system generates a composite score for each data point 421. As illustrated in FIG. 4C, the anomaly detection system finds the Euclidian distance d1, d2, d3 from each data point 421 to each of the hyperplanes 425, 426, and 427. The anomaly detection system sums an absolute value of the Euclidian distances to obtain the composite value for the data point.

Specifically, the system determines the shortest distance d1 between the data point 421 and a closest point 431 on the hyperplane 425. The system determines the shortest distance d2 between the data point 421 and a closest point 432 on the hyperplane 426. The system determines the shortest distance d3 between the data point 421 and a closest point 433 on the hyperplane 427. The system adds the Euclidian distances d1+d2+d3 to obtain a composite score for the data point 421.

In one embodiment, the system applies a weighted value to one or more of the principal components based on the effect the principal component has on the categorization of a data point as "anomalous." For example, referring to FIG. 4B, the system may determine that principal component 423 has a greater effect on the anomalous categorization of a data point than principal component 422. Accordingly, the Euclidian distance d3 may be multiplied by a weighting factor (such as ×1.5), and the Euclidian distance d2 may be multiplied by a weighting factor (such as ×1.1) to reflect the greater effect of the principal component 423 than the principal components 422 or 424 on the "anomalous" categorization of a data point.

FIG. 4D illustrates an array 440 of twelve (12) composite values 441 corresponding to twelve (12) data points in a data set. The system analyzes the composite values to identify one or more anomalous values. In the embodiment illustrated in FIG. 4D, the system applies a fixed percentage of 20% to the data set—indicating that in any given data set, the highest 20% of the composite values will be designated as "anomalous." Accordingly, the system categorizes composite values 441a ("231.42") and 441b ("324.16") as being anomalous. For example, the composite value 441a may correspond to data point 421a of FIG. 4A, and the composite value 441b may correspond to the data point 421b of FIG. 4B.

Each composite value 441 is derived from the measurement data from multiple sources. Accordingly, identifying a composite value 441 as anomalous does not identify for a user which source(s) contribute the most to the anomalous categorization of the composite value 441.

Figure 4E:
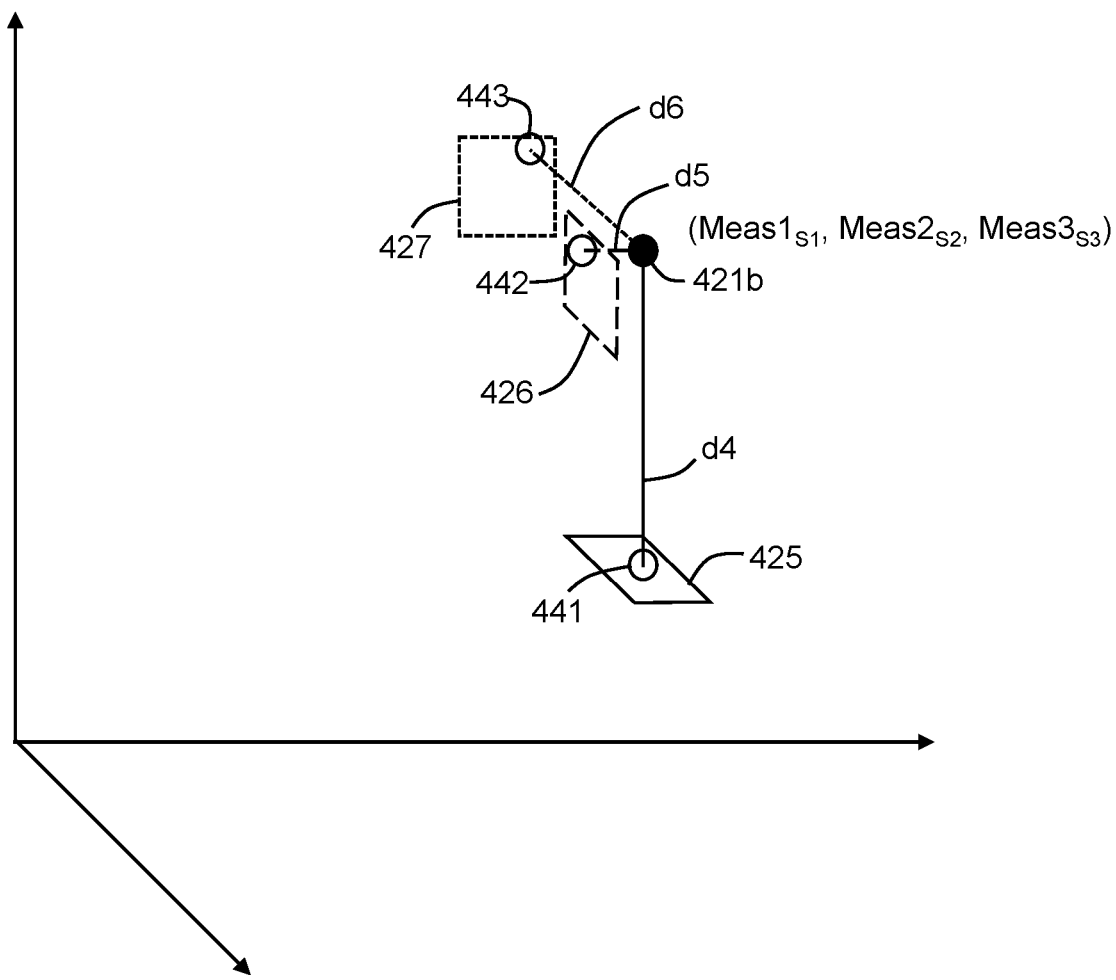

As illustrated in FIG. 4E, the system identifies the extent to which the individual sensors S1, S2, and S3 contribute to the anomalous categorization of the data point 421b.

The system calculates, for each sensor, an absolute value of a difference between the sensor measurement value and each of the principal components. Specifically, the system calculates the difference between each measurement and the closest points 441, 442, and 443 on each hyperplane 425, 426, and 427 defined by the principal components 422, 423, and 424.

Referring to FIG. 4E, the system calculates a sensor S1 deviation score for the data point 421b as: ($|Meas1_{S1}-d4|+|Meas1_{S1}-d5|+|Meas1_{S1}-d6|$). The system calculates a sensor S2 deviation score for the data point 421b as: ($|Meas2_{S2}-d4|+|Meas2_{S2}-d5|+|Meas2_{S2}-d6|$). The system calculates the sensor S3 deviation score for the data point 421b as: ($|Meas3_{S3}-d4|+|Meas3_{S3}-d5|+|Meas3_{S3}-d6|$). The sensor having the highest deviation score deviates the most from a baseline behavior for the sensor.

Figure 4F:
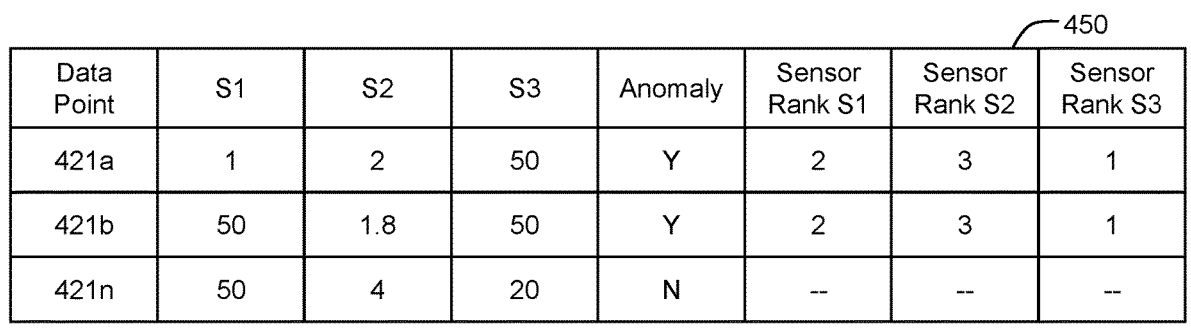

FIG. 4F illustrates a table 450 that includes a ranking of the sensors S1, S2, and S3 based on which sensor has the highest deviation score. In one or more embodiments, the table 450, or information based on the table 450 may be provided to a user. The user may interact with the table 450, or with a user interface providing information based on the table 450, to change a classification of a data point as "anomalous" or "non-anomalous" or to change a ranking of a particular sensor.

The table 450 identifies particular data points that are identified as anomalous and the sensors providing measurement data that make up the data point. In one or more embodiments, the table 450 also provides information for a data point that is not identified as anomalous. For example, the data points 421a and 421b may be identified as anomalous, and the data point 421n may a non-anomalous data point that is the next closest data point to being categorized as "anomalous." Accordingly, the system may provide information for the data point 421n to the user to allow the user to change a classification for the data point from "non-anomalous" to "anomalous."

The table 450 ranks the sensors S1, S2, and S3 based on the contributions of the sensors to the classification of the data points as "anomalous." The table 450 further displays measurement values for the sensors. While not displayed in FIG. 4F, in one or more embodiments, the system may normalize the sensor values so that all the sensors have the same range of output values. For example, if sensors S1 and S3 output measurements in a range from 0-50, and sensor S2 outputs measurements in a range from 1-5, the system may normalize the displayed values of sensors S1, S2, and S3 to all display a range from 0-1, allowing a user to easily compare the relative output values of sensors that have different measurement ranges.

In one or more embodiments, the system may provide the sensor rankings, as well as information regarding the type, location, measurement units, sensor criticality in the system, and other properties of the sensors, to a user. Accordingly, the system provides the user with actionable information about individual data sources, such as sensors, to identify data sources of interest and to determine any actions that should be taken in connection with the data sources.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause: obtaining a first data point and a plurality of additional data points, the first data point and the plurality of additional data points each comprising a plurality of measurements from a plurality of sources, the plurality of measurements including at least a first measurement from a first source and a second measurement from a second source; determining that the first data point is an anomalous data point based on a deviation of the first data point from the plurality of additional data points; determining a contribution of each of the plurality of measurements of the first data point, including a contribution of the first measurement and a contribution of the second measurement, to the deviation of the first data point from the plurality of additional data points at least by: performing a principal component analysis of the first data point and the plurality of additional data points to identify a variation of each data point from two or more principal components; determining a first difference between the first measurement of the first data point and a corresponding measurement of a first principal component; and determining a second difference between the second measurement of the first data point and a corresponding measurement of a second principal component; and ranking each measurement of the plurality of measurements based on a contribution of each measurement of the plurality of measurements to the deviation of the anomalous data point from the plurality of additional data points, wherein ranking each measurement of the plurality of measurements of the first data point comprises: responsive to determining that the first measurement of the plurality of measurements of the first data point has a higher contribution to the deviation of the first data point than the second measurement of the plurality of measurements of the first data point: ranking the first measurement higher than the second measurement in a ranking of the plurality of measurements of the first data point.

2. The media of claim 1, wherein determining that the first data point is anomalous comprises:
generating a plane representing the plurality of additional data points; and
determining a shortest distance between the first data point and the plane representing the plurality of additional data points,
wherein the shortest distance is a distance between the first data point and a second data point on the plane that is closest to the first data point.

3. The media of claim 2, wherein the first data point is determined to be anomalous based on the shortest distance between the first data point and the second data point being greater than a predetermined threshold distance.

4. The media of claim 1, wherein determining the contribution of each of the plurality of measurements of the first data point comprises:
responsive to determining that the first difference is greater than the second difference:
determining that the first measurement is a greater contributor than the second measurement to the deviation of the first data point from the plurality of additional data points.

5. The media of claim 4, wherein the first measurement is ranked higher than second measurement based on the determining that the first measurement is a greater contributor than the second measurement to the deviation of the first data point from the plurality of additional data points.

6. The media of claim 1, wherein the instructions further cause:
identifying the first measurement as having a highest contribution, from among the plurality of measurements, to the deviation of the first data point;
identifying a data source associated with the first measurement; and
notifying a user that the data source is in a fault state.

7. The media of claim 1, wherein determining the contribution of each of the plurality of measurements of the first data point to the deviation of the first data point from the plurality of additional data points comprises: applying the first data point and the plurality of additional data points to a neural network to determine the first data point is anomalous.

8. The media of claim 1, wherein the instructions further cause: receiving a user input identifying one or more of the plurality of the additional data points as being anomalous; and updating an algorithm for detecting anomalous data points according to the user input.

9. The media of claim 1, the instructions further cause:
training a machine learning model to identify one or more data points as anomalous,
wherein training the machine learning model comprises:
obtaining a training data set of historical data points comprising historical measurement data, the training data set comprising:
a plurality of historical data points, each historical data point comprising a plurality of measurements from a plurality of sources;
for each historical data point of the plurality of historical data points, an indication of whether the historical data point is anomalous;
training the machine learning model based on the training data set;
wherein determining that the first data point is an anomalous data point comprises applying the machine learning model to the first data point; and
responsive to applying the machine learning model to the first data point, identifying the first data point as anomalous.

10. A method, comprising: obtaining a first data point and a plurality of additional data points, the first data point and the plurality of additional data points each comprising a plurality of measurements from a plurality of sources, the plurality of measurements including at least a first measurement from a first source and a second measurement from a second source; determining that the first data point is an anomalous data point based on a deviation of the first data point from the plurality of additional data points; determining a contribution of each of the plurality of measurements of the first data point, including a contribution of the first measurement and a contribution of the second measurement, to the deviation of the first data point from the plurality of additional data points at least by: performing a principal component analysis of the first data point and the plurality of additional data points to identify a variation of each data point from two or more principal components; determining a first difference between the first measurement of the first data point and a corresponding measurement of a first principal component; and determining a second difference between the second measurement of the first data point and a corresponding measurement of a second principal component; and ranking each measurement of the plurality of measurements based on a contribution of each measurement of the plurality of measurements to the deviation of the anomalous data point from the plurality of additional data points, wherein ranking each measurement of the plurality of measurements of the first data point comprises: responsive to determining that the first measurement of the plurality of measurements of the first data point has a higher contribution to the deviation of the first data point than the second measurement of the plurality of measurements of the first data point: ranking the first measurement higher than the second measurement in a ranking of the plurality of measurements of the first data point.

11. The method of claim 10, wherein determining that the first data point is anomalous comprises:
generating a plane representing the plurality of additional data points; and
determining a shortest distance between the first data point and the plane representing the plurality of additional data points,
wherein the shortest distance is a distance between the first data point and a second data point on the plane that is closest to the first data point.

12. The method of claim 11, wherein the first data point is determined to be anomalous based on the shortest distance between the first data point and the second data point being greater than a predetermined threshold distance.

13. The method of claim 11, wherein determining the contribution of each of the plurality of measurements of the first data point comprises:
responsive to determining that the first difference is greater than the second difference:
determining that the first measurement is a greater contributor than the second measurement to the deviation of the first data point from the plurality of additional data points.

14. The method of claim 13, wherein the first measurement is ranked higher than second measurement based on the determining that the first measurement is a greater contributor than the second measurement to the deviation of the first data point from the plurality of additional data points.

15. The method of claim 10, further comprising:
identifying the first measurement as having a highest contribution, from among the plurality of measurements, to the deviation of the first data point from the plurality of additional data points;
identifying a data source associated with the first measurement; and
notifying a user that the data source is in a fault state.

16. The method of claim 10, wherein determining the contribution of each of the plurality of measurements of the first data point to the deviation of the first data point from the plurality of additional data points comprises: applying the first data point and the plurality of additional data points to a neural network to determine the first data point is anomalous.

17. The method of claim 10, further comprising: receiving a user input identifying one or more of the plurality of the additional data points as being anomalous; and updating an algorithm for detecting anomalous data points according to the user input.

18. The method of claim 10, further comprising:
training a machine learning model to identify one or more data points as anomalous,
wherein training the machine learning model comprises:
obtaining a training data set of historical data points comprising historical measurement data, the training data set comprising:
a plurality of historical data points, each historical data point comprising a plurality of measurements from a plurality of sources;
for each historical data point of the plurality of historical data points, an indication of whether the historical data point is anomalous;
training the machine learning model based on the training data set;
wherein determining that the first data point is an anomalous data point comprises applying the machine learning model to the first data point; and
responsive to applying the machine learning model to the first data point, identifying the first data point as anomalous.

19. A system, comprising: one or more processors; and memory storing instructions that, when executed by the one or more processors, cause the system to perform: obtaining a first data point and a plurality of additional data points, the first data point and the plurality of additional data points each comprising a plurality of measurements from a plurality of sources, the plurality of measurements including at least a first measurement from a first source and a second measurement from a second source; determining that the first data point is an anomalous data point based on a deviation of the first data point from the plurality of additional data points; determining a contribution of each of the plurality of measurements of the first data point, including a contribution of the first measurement and a contribution of the second measurement, to the deviation of the first data point from the plurality of additional data points at least by: performing a principal component analysis of the first data point and the plurality of additional data points to identify a variation of each data point from two or more principal components; determining a first difference between the first measurement of the first data point and a corresponding measurement of a first principal component; and determining a second difference between the second measurement of the first data point and a corresponding measurement of a second principal component; and ranking each measurement of the plurality of measurements based on a contribution of each measurement of the plurality of measurements to the deviation of the anomalous data point from the plurality of additional data points, wherein ranking each measurement of the plurality of measurements of the first data point comprises: responsive to determining that the first measurement of the plurality of measurements of the first data point has a higher contribution to the deviation of the first data point than the second measurement of the plurality of measurements of the first data point: ranking the first measurement higher than the second measurement in a ranking of the plurality of measurements of the first data point.

20. The system of claim 19, wherein determining that the first data point is anomalous comprises:
generating a plane representing the plurality of additional data points; and
determining a shortest distance between the first data point and the plane representing the plurality of additional data points,
wherein the shortest distance is a distance between the first data point and a second data point on the plane that is closest to the first data point.

21. The system of claim 19, wherein determining the contribution of each of the plurality of measurements of the first data point comprises:
responsive to determining that the first difference is greater than the second difference:
determining that the first measurement is a greater contributor than the second measurement to the deviation of the first data point from the plurality of additional data points.

22. The system of claim 21, wherein the first measurement is ranked higher than second measurement based on the determining that the first measurement is a greater contributor than the second measurement to the deviation of the first data point from the plurality of additional data points.

* * * * *